US009531900B2

(12) United States Patent
Momoka (10) Patent No.: US 9,531,900 B2
(45) Date of Patent: Dec. 27, 2016

(54) OPTICAL SCANNING APPARATUS AND IMAGE FORMING APPARATUS

(71) Applicant: CANON KABUSHIKI KAISHA, Tokyo (JP)

(72) Inventor: Toshiki Momoka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/916,167

(22) PCT Filed: Sep. 2, 2014

(86) PCT No.: PCT/JP2014/073032
§ 371 (c)(1),
(2) Date: Mar. 2, 2016

(87) PCT Pub. No.: WO2015/033918
PCT Pub. Date: Mar. 12, 2015

(65) Prior Publication Data
US 2016/0219178 A1 Jul. 28, 2016

(30) Foreign Application Priority Data
Sep. 6, 2013 (JP) ................................ 2013-185205

(51) Int. Cl.
*G03G 15/00* (2006.01)
*H04N 1/00* (2006.01)
(Continued)

(52) U.S. Cl.
CPC .......... *H04N 1/00909* (2013.01); *G02B 26/12* (2013.01); *H04N 1/00551* (2013.01);
(Continued)

(58) Field of Classification Search
CPC ............ H04N 1/00909; H04N 1/00557; H04N 1/00551; H04N 1/113; G02B 26/12
See application file for complete search history.

(56) References Cited

U.S. PATENT DOCUMENTS

| 8,542,263 B2 * | 9/2013 | Yamashita | ............... B41J 2/473 347/242 |
| 2013/0342628 A1 * | 12/2013 | Iwai | ....................... G02B 26/12 347/224 |

FOREIGN PATENT DOCUMENTS

| JP | H0580268 A | 4/1993 |
| JP | 06-021014 U | 3/1994 |

(Continued)

*Primary Examiner* — Hoang Ngo
(74) *Attorney, Agent, or Firm* — Canon U.S.A. Inc., IP Division (57) ABSTRACT

To prevent solidification of molten elastic material before an elastic member is formed, and improve dust-proof capabilities of a housing.
Included are an opening 104a, dust-proofing glass 105, an elastic members 107 to close off a gap between the dust-proofing glass 105 and a cover member 104, an inlet 104d for pouring in molten elastic material when forming the elastic member 107, and a channel 104e through which the molten elastic material poured in from the inlet 104d flows to form the elastic member 107. When the molten elastic material is poured in from the inlet 104d and flows through the channel 104e to form the elastic members 107, the cross-sectional area of the elastic member 107 in the lateral direction of the openings 104a closer to the inlet 104d is larger than the cross-sectional area of the elastic member 107 in the lateral direction farther from the inlet 104d.

8 Claims, 6 Drawing Sheets

(51) Int. Cl.
*H04N 1/113* (2006.01)
*G02B 26/12* (2006.01)
*H04N 1/10* (2006.01)

(52) U.S. Cl.
CPC ........... *H04N 1/00557* (2013.01); *H04N 1/10* (2013.01); *H04N 1/113* (2013.01); *H04N 2201/0094* (2013.01)

(56) References Cited

FOREIGN PATENT DOCUMENTS

| | | | |
|---|---|---|---|
| JP | 2003152352 A | 5/2003 | |
| JP | 2008257040 A | 10/2008 | |

\* cited by examiner

OPTICAL SCANNING APPARATUS AND IMAGE FORMING APPARATUS

TECHNICAL FIELD

The present invention relates to dust-proofing measures for an optical scanning apparatus used in image forming apparatus such as a copier, printer, facsimile apparatus, a combined apparatus thereof, and so forth.

BACKGROUND ART

Figure 6:
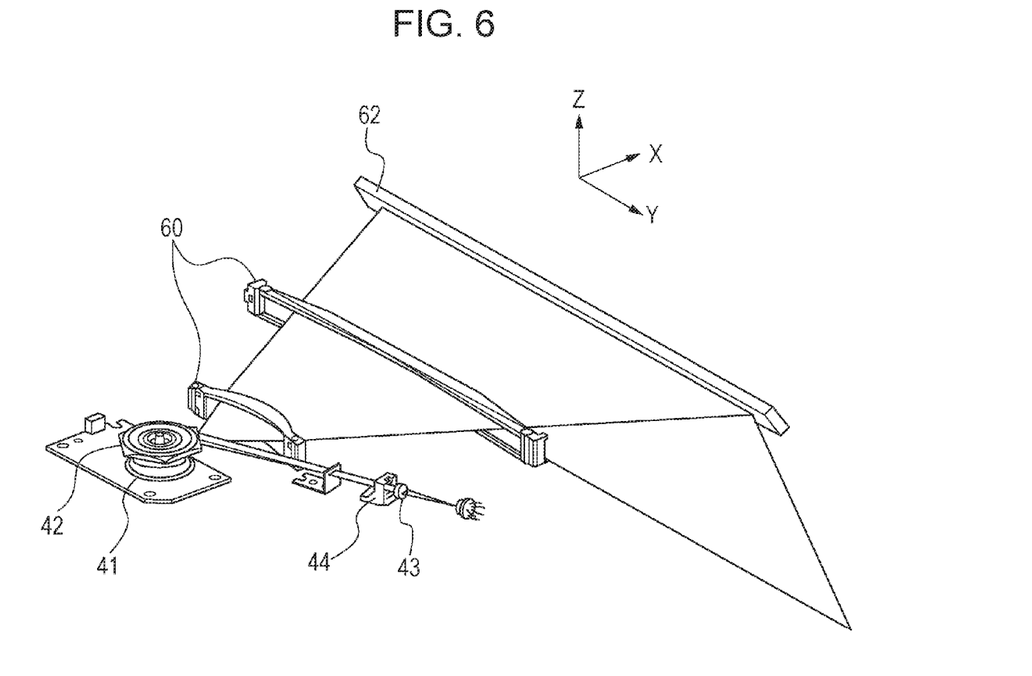
FIG. 6 is a schematic diagram illustrating the configuration of a conventional optical scanning apparatus.

There is an optical scanning apparatus used in electrophotography image forming apparatus that have the following configuration. That is to say, optical scanning apparatuses which deflect a light beam emitted from a light source by a rotational polygonal mirror, and guide the deflected light beam to a photosensitive face of a photosensitive member by optical parts such as lenses and mirrors and the like, thereby forming a latent image on the photosensitive member. FIG. 6 illustrates an overview of components of an optical scanning apparatus that is conventionally generally employed. Note that detailed description of an optical scanning apparatus will be made in the later-described embodiments. In a case where a contaminant such as dust or the like adheres to an internal optical part of an optical scanning apparatus, the quantity of light of the light beam on the photosensitive member deteriorates due to the adhered dust shielding the light ray, leading to occurrence of variance in concentration. Pollution of the atmosphere has led to an increase in minute particles and chemical substances in the atmosphere that are 1 μm in size or smaller, so deterioration in image quality due to soiling of the optical parts has become more problematic than ever before.

Various methods are being used to prevent external intrusion of dust and the like into the optical scanning apparatus, such as measures of sealing off by placing foamed members in gaps at peripheral portions of the optical scanning apparatus, measures of applying tape, and so forth, but there is need for even higher airtightness due to the following reasons. Demand for faster image forming speed in recent years has necessitated faster rotational speed of the rotational polygonal mirror as compared to conventional products. The rotational polygonal mirror disposed within the optical scanning apparatus generates airflow due to high-speed rotations. Wind flows through minutes spaces connecting the continuously connected bubbles at places where the foamed material has been adhered, and air flows from the inside out in some places while air flows from the outside in at some places. The air flowing from the outside in contains minute particles that soil the optical parts, so the more the apparatus runs, the more minute particles intrude therein, and adhere on the surface of the optical parts on the inside of the housing. Particularly, dust contained in the airflow around the rotational polygonal mirror adheres to the reflecting faces of the rotational polygonal mirror rotating at high speed. That is to say, rotation of the rotational polygonal mirror causes Karman vortex and turbulence near the reflecting faces of the rotational polygonal mirror, and the airflow bearing the dust violently collides with the reflecting faces. As a result, the minute particles colliding with the reflecting faces of the rotational polygonal mirror are accumulated, soiling progresses from portions where more airflow collides, and the reflectance of the soiled portions deteriorates. The quantity of light of the light beam guided onto the photosensitive member decreases as the reflectance decreases due to such contamination, thereby causing the problem that the output image concentration is reduced.

Optical scanning apparatuses need an opening for outputting the light beam from within the optical scanning apparatus to the outside, in order to guide the light beam deleted within the optical scanning apparatus on the photosensitive member. Accordingly, optical scanning apparatuses always have an opening for emitting the light beam to the outside of the optical scanning apparatus. A mainstream measure to avoid the soiling described above is to apply a glass member by two-sided tape. PTL 1 also proposes a configuration where part of the glass member is fixed by adhesion to the housing.

CITATION LIST

Patent Literature

PTL 1: Japanese Patent Laid-Open No. 5-80268

SUMMARY OF INVENTION

Technical Problem

However, the configuration using two-sided tape has a problem in that the dust-proofing glass and the cover member are fixed by adhesion using a thin member such as two-sided tape, so gaps are formed by warping and the like of the cover member. The cover member has a large opening slit to emit the light beam, so improving the rigidity in the same way as with the housing is difficult. Accordingly, the two-sided tape make come loose or the like due to temporary deformation at the time of transporting the cover member, for example. Further, the adhesion method described in PTL 1 involves fixing the dust-proofing glass using a hard adhesive agent having a hardness of 60 or higher, so warping occurs during temperature fluctuation, due to the difference in linear expansion between the housing, of which resin materials are mainstream, and the dust-proofing glass. Further, the adhesive agent is not applied to the entire region where the housing and the dust-proofing glass come into contact, is not only is it difficult to completely do away with gaps, but there is the possibility that the surface of the glass member that transmits the light beam may be soiled by the adhesive agent stringing when coating the glass member.

Now, there is a method to fill in between the dust-proofing glass and the cover member with an elastic material such as rubber or the like, but the procedure is prolonged, since the rubber is first applied and thereafter the dust-proofing glass is fixed. Cases of using an elastic material that can be integrally formed with the cover member, such as hot-melt adhesive or the like, also have problems, in that the fluidity of the molten elastic material is low, and the elastic material may solidify before the intended shape is formed.

The present invention has been made in light of such a current state, and it is an object thereof to prevent solidification of the molten elastic material before the elastic member is formed, and thus improve dust-proof capabilities of the housing.

Solution to Problem

In order to solve the above-described problems, the present invention has the following configuration.

(1) Provided are: a light source configured to emit a light beam; a rotary polygonal mirror configured to deflect the light beam emitted from the light source, so as to scan the light beam on a photosensitive member in a scanning direction; an optical member configured to guide the light beam deflected by the rotational polygonal mirror to the photosensitive member; a housing in which the rotational polygonal mirror and the optical member are disposed; a cover member attached to the housing, in which cover member there is formed an emission opening to externally emit the light beam deflected by the rotational polygonal mirror, from within a space formed by the housing and the cover member; a transparent member configured to pass the light beam and to close off the emission opening; a seal member formed of an elastic material, to close off a gap between the transparent member and the cover member; an inlet for pouring in the molten elastic material when forming the seal member; and a channel through which the molten elastic material poured in from the inlet flows, the channel being formed in the cover member following an edge of the emission opening so as to surround the emission opening. The inlet is connected to the channel between both ends of the emission opening in the longitudinal direction of the emission opening, and a cross-sectional area of the channel in the lateral direction of the emission opening following the edge of the emission opening closer to the inlet in the longitudinal direction of the emission opening, is larger than a cross-sectional area of the channel in the lateral direction following the edge of the emission opening farther from the inlet in the longitudinal direction of the emission opening.

Advantageous Effects of Invention

According to the present invention, solidification of the molten elastic material before the elastic member is formed can be prevented, and dust-proof capabilities can be improved.

DESCRIPTION OF EMBODIMENTS

A form for carrying out the present invention will be described in detail by way of embodiment, with reference to the drawings. First, the configuration of a conventional optical scanning apparatus will be described, and thereafter the embodiment will be described.

[Configuration of Conventional Optical Scanning Apparatus]

FIG. 6 illustrates an overview of components of an optical scanning apparatus that is conventionally generally employed. The optical scanning apparatus that irradiates a photosensitive member by a light beam to form an electrostatic latent image includes a rotational polygonal mirror 42 that is a deflector, a motor unit 41 that rotates the rotational polygonal mirror 42, and optical members. The optical members are a collimator lens 43 that forms the input light flux to the motor unit 41 and a cylinder lens 44. The optical members also are one or more fθ lenses (hereinafter referred to as optical lens) 60 to make the scanning speed of the light beam on the photosensitive member to be a constant speed, and a reflecting mirror 62 that guides the light beam to the photosensitive member. The motor unit 41 rotates the rotational polygonal mirror 42, which has a great number of reflecting mirror faces on the perimeter thereof, at high speed, thereby deflecting the incident light beam so as to scan over the photosensitive member. Note that in the following description, the rotational axis direction of the rotational polygonal mirror 42 by the motor unit 41 is the Z-axis direction, the main scanning direction which is the scanning direction of the light beam, or the longitudinal direction of the reflecting mirror 62, is the Y-axial direction, and a direction perpendicular to the Y axis and the Z axis is the X-axial direction.

Embodiment

Image forming Apparatus

Figure 1:
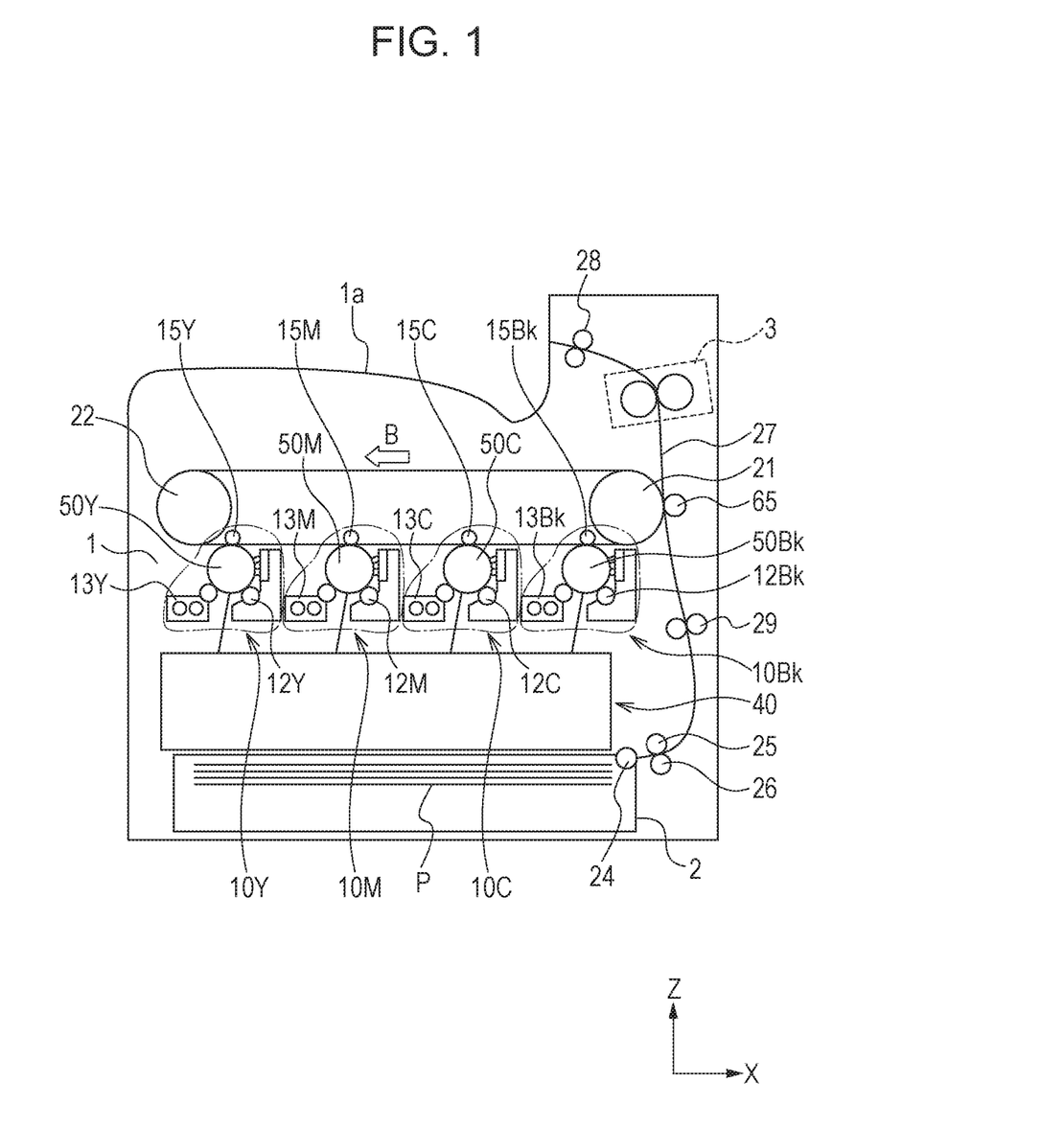
FIG. 1 is a schematic diagram of an image forming apparatus according to an embodiment.

The configuration of the image forming apparatus according to the embodiment will be described. FIG. 1 is a schematic configuration diagram illustrating the overall configuration of a tandem-type color laser beam printer. This laser beam printer (hereinafter referred to simply as printer) has four image-generating engines 10Y, 10M, 10C, and 10Bk (illustrated by single-dot dashed lines), that form toner images for each color of yellow (Y), magenta (M), cyan (C), and black (Bk). The printer also has an intermediate transfer belt 20 to which toner images from the image-generating engines 10Y, 10M, 10C, and 10Bk are transferred. The printer is configured to form a full-color image by transferring the toner images, multiply transferred onto the intermediate transfer belt 20, onto a recording sheet P that is a recording medium. Hereinafter, the symbols Y, M, C, and Bk, which represent the colors, will be omitted unless necessary.

The intermediate transfer belt 20 is formed endless, run over a pair of belt conveying rollers 21 and 22, and is configured to have the toner images formed at each of the image-generating engines 10 transferred thereupon while rotationally running in the direction of the arrow B. A secondary transfer roller 65 is disposed at a position facing the one belt conveying roller 21 across the intermediate transfer belt 20. The recording sheet P passes between the secondary transfer roller 65 and the intermediate transfer belt 20 that press against each other, whereby the toner image is transferred from the intermediate transfer belt 20. The four above-described image-generating engines 10Y, 10M, 10C, and 10Bk are disposed in parallel on the lower side of the intermediate transfer belt 20, and are arranged to transfer toner images formed in accordance with image information for each color into the intermediate transfer belt 20 (hereinafter referred to as primary transfer). These four image-generating engines 10 are disposed in the order of the yellow image-generating engine 10Y, magenta image-generating engine 10M, cyan image-generating engine 10C, and black image-generating engine 10Bk, in the direction of turning of the intermediate transfer belt 20 (direction of arrow B).

An optical scanning apparatus 40, which exposes a photosensitive drum 50 that is the photosensitive member provided to each image-generating engine 10 in accordance with image information, is disposed beneath the image-generating engines 10. Detailed illustration and description of the optical scanning apparatus 40 will be omitted in FIG. 1, and will be described later with reference to FIG. 2(b). The optical scanning apparatus 40 is provided in common for all of the mage-generating engines 10Y, 10M, 10C, and 10Bk, and has four semiconductor lasers, omitted from illustration, that emit laser beams modulated in accordance with image information of each color. The optical scanning apparatus 40 also has a rotational polygonal mirror 42 that deflects the light beams so that the light beams corresponding to the photosensitive drums 50 scan in the axial direction of the photosensitive drums 50 (Y-axial direction), and a motor unit 41 that rotates the rotational polygonal mirror 42. The light beams deflected by the rotational polygonal mirror 42 are guided through optical members disposed within the optical scanning apparatus 40, let onto the photosensitive drums 50, and expose the photosensitive drums 50.

Each image-generating engine 10 has the photosensitive drum 50, and a charging roller 12 that charges the photosensitive drum 50 to a constant background potential. Each image-generating engine 10 also has a developer 13 that develops an electrostatic latent image formed on the photosensitive drum 50 by being exposed by the light beam, to form a toner image. The developer 13 forms a toner image on the photosensitive drum 50 in according to image information of each color.

A primary transfer roller 15 is disposed at a position facing the photosensitive drum 50 of each image-generating engine 10, across the intermediate transfer belt 20. A predetermined transfer voltage is applied to the primary transfer roller 15, whereby the toner image on the photosensitive drum 50 is transferred into the intermediate transfer belt 20.

On the other hand, the recording sheet P is supplied from a sheet feed cassette 2 stored at the bottom portion of the multi-function printer 1 to within the printer, more specifically to a secondary transfer position where the intermediate transfer belt 20 and the secondary transfer roller 65 come into contact. A pickup roller 24 and sheet feed roller 25 for feeding out the recording sheet P stored within the sheet feed cassette 2 are disposed in tandem above the sheet feed cassette 2. A retarder roller 26 is disposed at a position facing the sheet feed roller 25, to prevent double-feeding of recording sheets P. A conveyance path 27 for the recording sheet P within the printer is provided generally vertically, following the right side face of the multi-function printer 1. A recording sheet P fed out from the sheet feed cassette 2 climbs the conveyance path 27, and is sent to a registration roller 29 that controls the timing at which the recording sheet P should enter the secondary transfer position. Thereafter, the recording sheet P is subjected to transfer of the toner image at the secondary transfer position, and subsequently sent to a fixer 3 (illustrated by dotted lines) provided downstream in the conveyance direction. The recording sheet P upon which the toner image has been fixed by the fixer 3 passes by a discharge roller 28 and is discharged onto a discharge tray 1a provided on the upper portion of the multi-function printer 1.

To form a fill-color image with the color laser beam printer configured in this way, first, the optical scanning apparatus 40 exposes the photosensitive drums 50 of the image-generating engines 10 at predetermined timings in accordance with the image information of each color. Thus, latent images in accordance with the image information are formed on the photosensitive drums 50 of the image-generating engines 10. In order to obtain good image quality, the latent images formed by the optical scanning apparatus 40 must be precisely reproduced at predetermined positions on the photosensitive drum 50, and further, the quantity of light of the light beam for forming the latent images must be able to be at a desired value in a stable manner. Note that the image forming apparatus is not restricted to the image forming apparatus described by way of FIG. 1.

[Description of Optical Scanning Apparatus]

Figure 2:
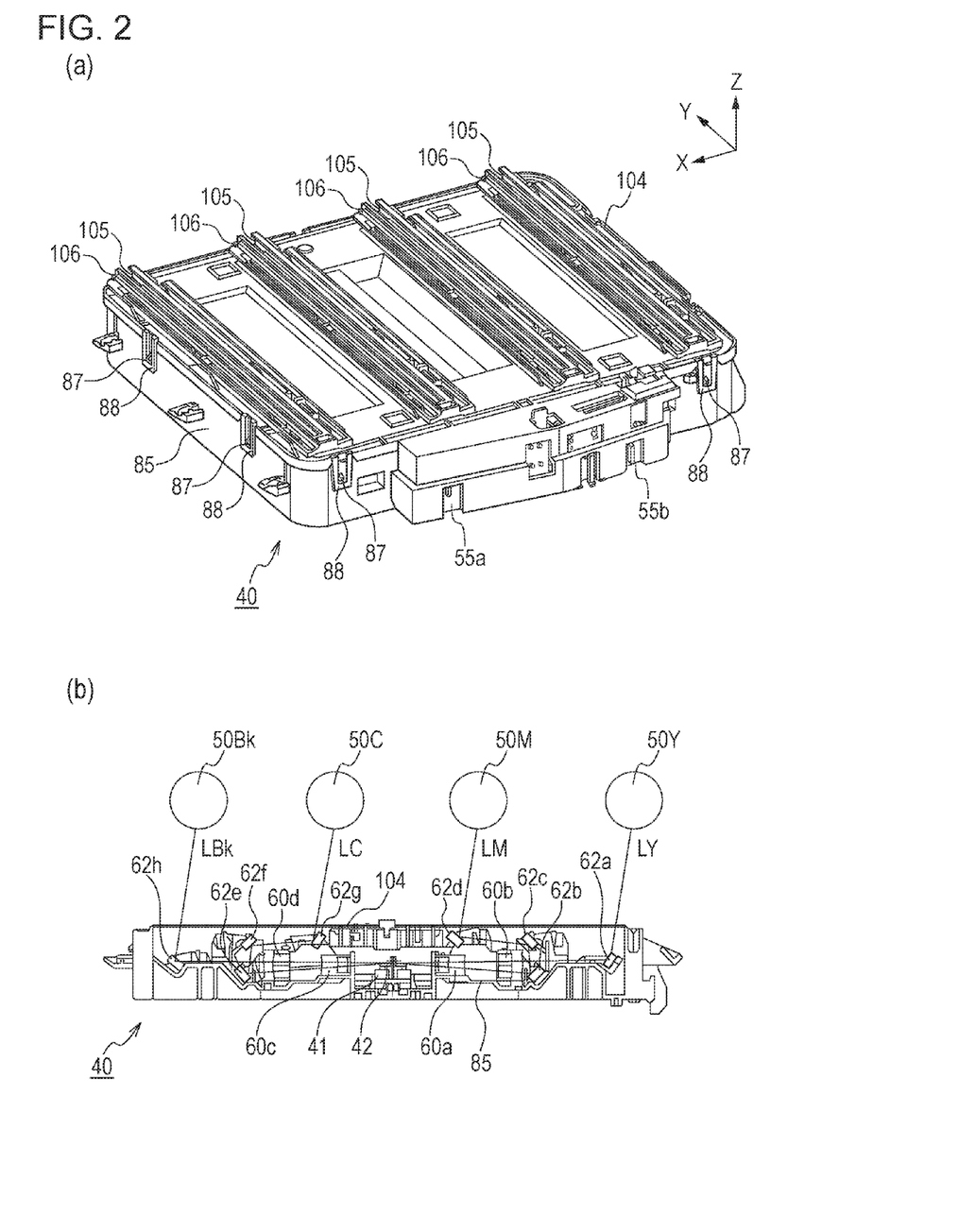
FIG. 2 is a perspective view and cross-sectional view of an optical scanning apparatus according to the embodiment.

The optical scanning apparatus according to the present embodiment will be described with reference to FIGS. 2 through 5. FIG. 2(a) is a perspective view illustrating an external view of the optical scanning apparatus 40, where an opening of a housing 85 is covered by a cover member 104. FIG. 2(b) is a schematic cross-sectional view of the optical scanning apparatus 40 in FIG. 2(a), illustrating the inner structure of the optical scanning apparatus 40. The optical scanning apparatus 40 has the housing 85 and cover member 104. The optical scanning apparatus 40 also has a light source unit 55 (55a and 55b) that emit light beams, the rotational polygonal mirror 42 that reflects and deflects light beams, and the motor unit 41 that rotates the rotational polygonal mirror 42. The optical scanning apparatus 40 also has optical lenses 60 (60a through 60d) for imaging the light beam on the photosensitive drums 50, and reflecting mirrors 62 (62a through 62h) for guiding the light beam to the photosensitive drums 50. The optical scanning apparatus 40 further has the housing 85, the cover member 104, dust-proofing glass 105 that is a transparent member, and a pressuring member 106. Although description will be made in the present embodiment regarding an arrangement where the transparent member covering an opening 104a of the cover member 104 is the dust-proofing glass 105, this is not restrictive. That is to say, it is sufficient for the member covering the opening 104a for the light beam to be a transparent member, and may be plastic, for example. The housing 85 is for fixing and holding the optical members, and the cover member 104 is a cover for isolating the optical parts disposed within along with the housing 85. The dust-proofing glass 105 is glass that is mounted on the cover member 104, to transmit light beams. Further, the pressuring member 106 is a member to fix the dust-proofing glass 105 to the cover member 104.

(Configuration of Housing)

The housing 85 has a bottom face (bottom portion) which is a face parallel to the X-Y plane, and outer walls (also referred to as side walls or peripheral portion) generally parallel to the Z-axial direction that are erected from the bottom face. While one end side of the peripheral portion is lined to the bottom face, the other end side of the peripheral portion forms an aperture (hereinafter also referred to as opening). The rotational polygonal mirror 42 and the other optical members are assembled into the optical scanning apparatus through this opening at the time of assembly of the apparatus. The housing 85 has housing-side engaging portions 87 that engage cover-side engaging portions 88 provided to the later-described cover member 104. The cover-side engaging portions 88 and housing-side engaging portions 87 make up a snap-fit mechanism, the snap-fit mechanism fixing the cover member 104 to the housing 85. The light source unit 55 (55a and 55b) has multiple light sources provided, such as four colors worth in the case of a four-color image forming apparatus for example, with each fixed on the peripheral portion of the housing 85.

(Optical Path of Light Beams)

Next, the optical paths of the light beams LBk, LC, LM, and LY will be described with reference to FIG. 2B. The light beam LY corresponding to the photosensitive drum 50Y, that has been emitted from the light source unit 55, is deflected by the rotational polygonal mirror 42 and enters the optical lens 60a. The light beam LY that has passed through the optical lens 60a is input to the optical lens 60b, and after having passed through the optical lens 60b is reflected at the reflecting mirror 62a. The light beam LY reflected at the reflecting mirror 62a passes through a transparent window that is omitted from illustration, and scans the photosensitive drum 50Y.

The light beam LM corresponding to the photosensitive drum 50M, that has been emitted from the light source unit 55, is deflected by the rotational polygonal mirror 42 and enters the optical lens 60a. The light beam LM that has passed through the optical lens 60a is input to the optical lens 60b, and after having passed through the optical lens 60b is reflected at the reflecting mirror 62b, reflecting mirror 62c, and reflecting mirror 62d. The light beam LM reflected at the reflecting mirror 62d passes through a transparent window that is omitted from illustration, and scans the photosensitive drum 50M.

The light beam LC corresponding to the photosensitive drum 50C, that has been emitted from the light source unit 55, is deflected by the rotational polygonal mirror 42 and enters the optical lens 60c. The light beam LC that has passed through the optical lens 60c is input to the optical lens 60d, and after having passed through the optical lens 60d is reflected at the reflecting mirror 62e, reflecting mirror 62f, and reflecting mirror 62g. The light beam LC reflected at the reflecting mirror 62g passes through a transparent window that is omitted from illustration, and scans the photosensitive drum 50C.

The light beam LBk corresponding to the photosensitive drum 50Bk, that has been emitted from the light source unit 55, is deflected by the rotational polygonal mirror 42 and enters the optical lens 60c. The light beam LBk that has passed through the optical lens 60c is input to the optical lens 60d, and after having passed through the optical lens 60d is reflected at the reflecting mirror 62h. The light beam LBk reflected at the reflecting mirror 62h passes through a transparent window that is omitted from illustration, and scans the photosensitive drum 50Bk.

[Configuration of Cover Member]

The cover member 104 is attached to the housing 85 so as to cover the opening of the housing 85, to prevent the optical members provided within the housing 85 from being soiled. The cover member 104 according to the present embodiment has an upper cover 110 (blocking face) that is a first face covering the opening, as illustrated in FIG. 3A. The upper cover 110 has cover-side engaging portions 88 engaging the housing-side engaging portions 87. The cover member 104 also has the rectangular openings 104a, which are four emission openings for emitting the light beam LY, light beam LM, light beam LC, and light beam LBk.

The cover-side engaging portions 88 are erected on the upper cover 110 of the cover member 104. When mounting the cover member 104 onto the housing 85, the cover-side engaging portions 88 are moved so as to follow the outer face of the peripheral portion of the housing 85, and engaged with the housing-side engaging portions 87 provided to the housing 85. The cover member 104 is fixed to the housing 85 by the housing-side engaging portions 87 and the cover-side engaging portions 88 engaging. The cover member 104 is placed over the housing 85, the cover-side engaging portions 88 of the cover member 104 and the housing-side engaging portions 87 of the housing 85 are engaged, thereby configuring the optical scanning apparatus 40 as illustrated in FIG. 2(a).

(Configuration Nearby Opening)

Figure 3:
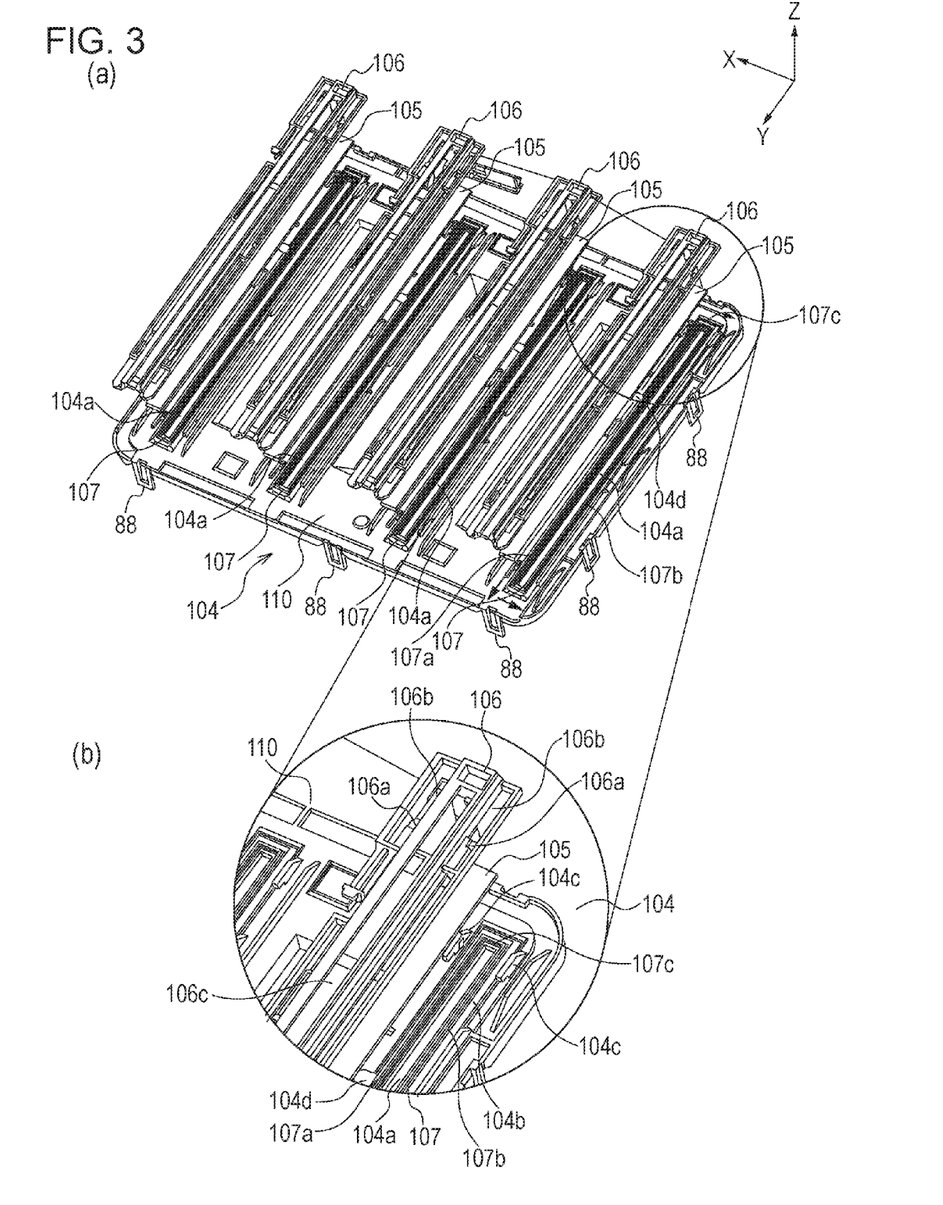
FIG. 3 is a perspective view and enlarged view of principal portions of a cover member according to the embodiment.

The configuration of the cover member 104 will be described in detail with reference to FIG. 3 and FIG. 4. FIG. 3(a) is a perspective view of the cover member 104, and FIG. 3(b) is an enlarged view of the encircled portion in FIG. 3(a). The cover member 104 is provided with the rectangular openings 104a having a width capable of passing light beams, as described above. The cover member 104 also has recessed portions 104b provided one size larger than the openings 104a (see FIG. 5(a)), for installing the dust-proofing glass 105 upon the openings 104a. The recessed portions 104b are continuous grooves surrounding the openings 104a. Multiple claws 104c are provided around the recessed portions 104b, in the lateral direction (Y-axial direction) of the cover member 104 (can also be said to be the longitudinal direction of the openings 104a), for fixing the pressuring members 106 that pressure the dust-proofing glass 105 against the cover member 104. The pressuring members 106 are provided with attaching portions 106a corresponding to the claws 104c.

Fixing of the pressuring members 106 to the cover member 104 is performed according to the following procedures. First, the claws 104c are passed through holes 106b provided to the pressuring members 106, corresponding to the respective claws 104c. After the cover member 104 and the pressuring members 106 are brought into close contact, the pressuring members 106 are slid in the lateral direction of the cover member 104. This engages the claws 104c and the attaching portions 106a, thereby enabling the cover member 104 to be fixed to the pressuring members 106.

The pressuring members 106 have rectangular openings 106c having a width capable of passing light beams, the openings 106c being disposed so as to be situated in the direction of emission of light beams from the openings 104a of the cover member 104. The pressuring members 106 have pressuring portions, omitted from illustration, for pressing the dust-proofing glass 105 against the cover member 104. The pressuring portions are the rear faces of the pressuring members 106 illustrated in FIG. 3(b), i.e., the faces of the pressuring members 106 at the side facing the cover member 104. The pressuring portions are provided at positions where they do not shield the light beams but come into contact with the dust-proofing glass 105, and are formed as flat planes longer in the longitudinal direction (X-axial direction) of the dust-proofing glass 105 than the width (length in the longitudinal direction), so that the pressuring portions uniformly pressure the dust-proofing glass 105. The reason is that if the width of the pressuring portions is narrower than the width of the dust-proofing glass 105, the pressuring portions will locally pressure the dust-proofing glass 105, and there is the danger of the dust-proofing glass 105 deforming.

Elastic members 107, which are seal portions integrally formed with the upper cover 110, are provided on the cover member 104. The elastic members 107 are provided to seal off the gap between the openings 104a of the cover member 104 and the dust-proofing glass 105 so as to prevent intrusion of dust and so forth into the housing 85, i.e., for dust-proofing. The elastic members 107 are formed by double-shot injection molding along with the upper cover 110. Alternatively, the elastic members 107 are formed by a method such as insert molding or outsert molding, where the upper cover 110 is molded, and thereafter the upper cover 110 is relocated into another mold and the elastic members 107 are additionally molded. The elastic material which is the molding material for the elastic members 107 has little heat capacity, and readily cools and hardens. Accordingly, by injecting the molten material for the elastic material at around 100° C. using insert molding or outsert molding enables the two to be integrated without deforming the upper cover 110, that has been formed beforehand, by the heat. In the present embodiment, a molten elastic material at 120° C. was poured onto the upper cover 110 formed of an acrylonitrile butadiene styrene (ABS) material from an inlet 104d provided to the cover member 104, from the outer side of the cover member 104, so as to flow the elastic material along a channel 104e (see FIG. 4). In this case as well, rapid cooling and hardening of the elastic material was observed immediately after having come into contact with the cover member 104, and the two were integrated without deformation.

Figure 4:
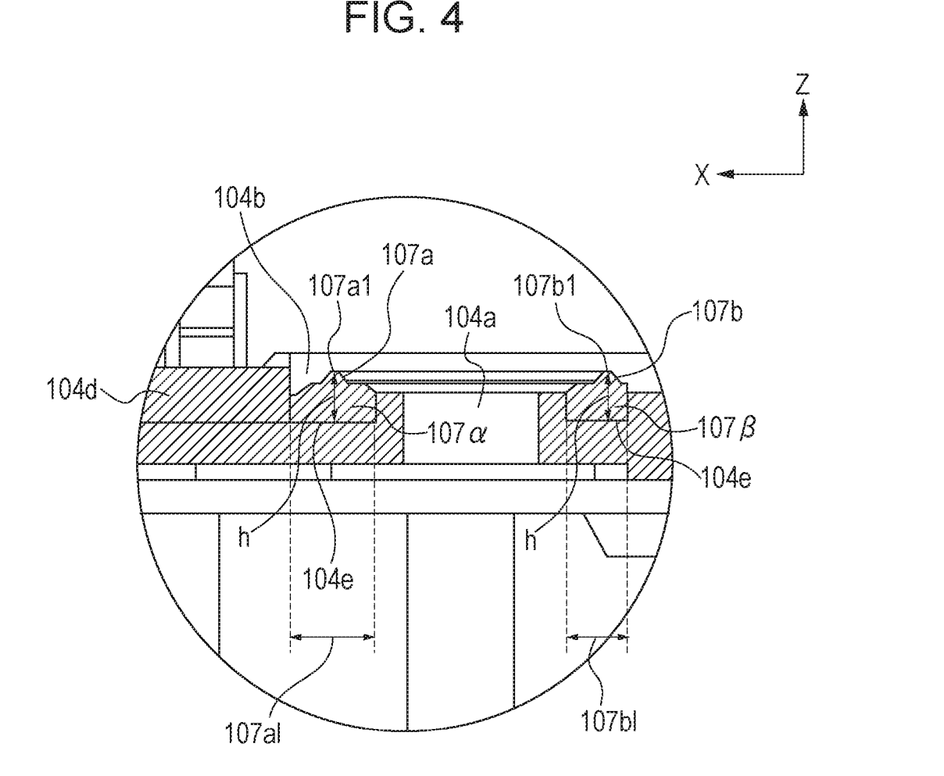
FIG. 4 is a cross-sectional view of principal portions of a cover member according to the embodiment.
Figure 5:
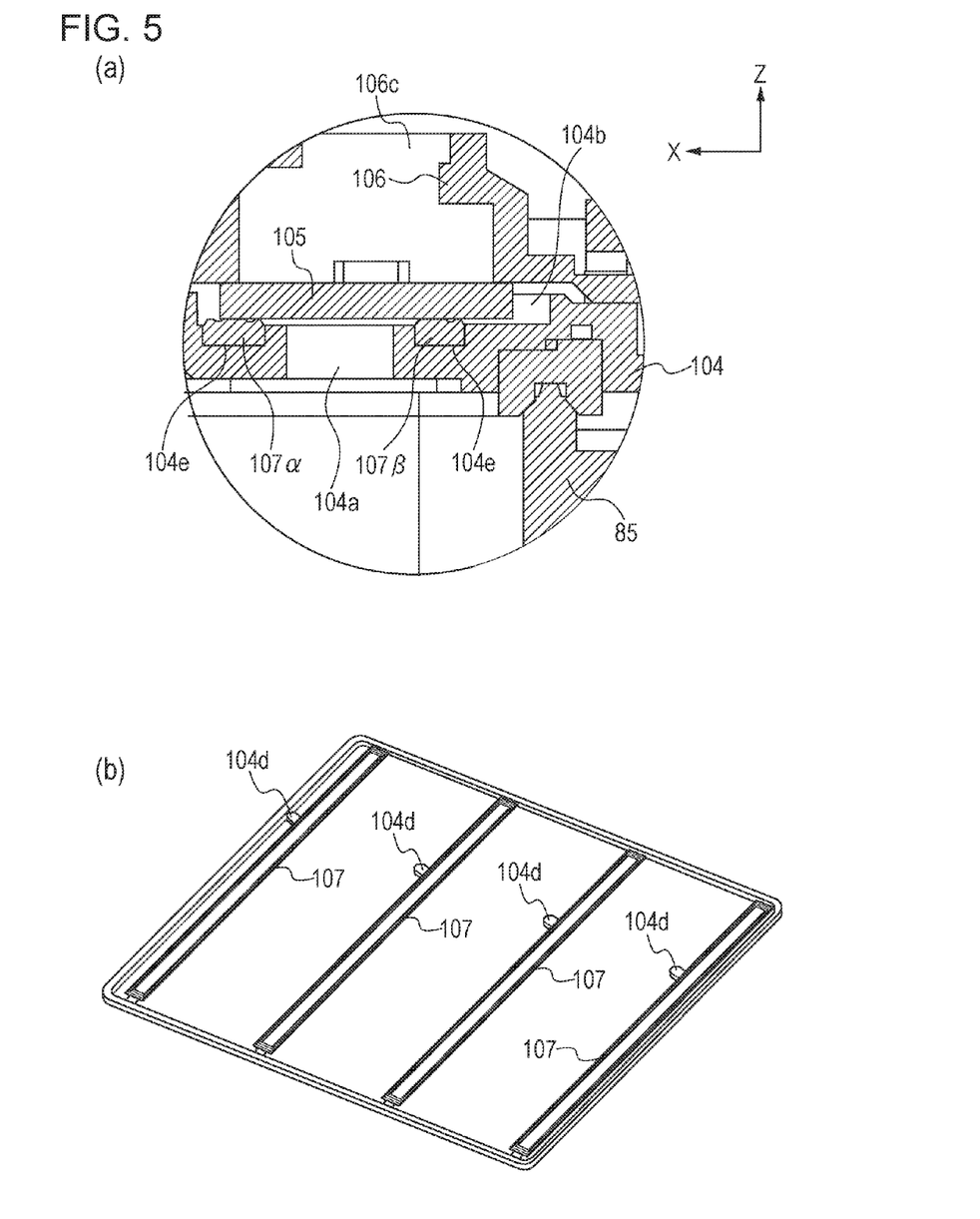
FIG. 5 is a cross-sectional view of the optical scanning apparatus according to the embodiment, and a perspective view of elastic material.

The elastic members 107 is provided such that the width from a tip portion 107a1, which is a protrusion of the elastic members 107, to a tip portion 107b1, is smaller than the width of the dust-proofing glass 105 (see FIG. 4). Accordingly, by placing the dust-proofing glass 105 on the elastic members 107, and mounting the pressuring members 106 to the cover member 104, the dust-proofing glass 105 is pressured and fixed in a state of being sandwiched between the pressuring members 106 and the elastic members 107. At this time, the elastic members 107 continuously comes in contact with the lower face of the dust-proofing glass 105, i.e., following the perimeter of the face of the dust-proofing glass 105 facing the cover member 104. Accordingly, the gap between the cover member 104 and the dust-proofing glass 105 can be completely filled in, thereby greatly improving dust-proofing capabilities.

FIG. 4 is a cross-sectional view illustrating a cross section taken nearby the inlet 104d of the cover member 104 along the X-axial direction. The elastic member 107 is formed surrounding the perimeter of the opening 104a, forming a rectangular frame, as illustrated in FIG. 3A. That is to say, the recessed portion 104b is formed to the cover member 104 so as to surround the edge of the openings 104a. The elastic member 107 is molded in the recessed portion 104b, so the elastic member 107 surrounds the edge of the opening 104a, in the same way as the recessed portion 104b. With regard to the rectangular elastic member 107 having four sides, the cross-section of the side 107a (see FIG. 3(b)) of the elastic member 107 closest to the inlet 104d is denoted as cross-section 107α. Also, the cross-section of the side 107b of the elastic member 107 facing the inlet 104d (can also be said to be the far side) (see FIG. 3(b)) is denoted as cross-section 107β. With the cross-sectional area of the cross-section 107α of the side 107a of the elastic member 107 close to the inlet 104d denoted by 107aS, the cross-sectional area 107aS is a constant cross-sectional area in the Y-axial direction. Also, with the cross-sectional area of the cross-section 107β of the side 107b of the elastic member 107 facing the inlet 104d denoted by 107bS, the cross-sectional area 107bS is a constant cross-sectional area in the Y-axial direction.

The cross-section 107α and cross-section 107β have shapes partly raised at the top, with a portion protruding in the plus side of the Z-axial direction, having tip portion 107a1 and tip portion 107b1 as illustrated in FIG. 4 and elsewhere. Due to having the tip portion 107a1 and tip portion 107b1, the cross-section 107α and cross-section 107β can further block between the dust-proofing glass 105 and upper cover 110 without any gap when the dust-proofing glass 105 is pressed toward the cover member 104 side by the holding member 106. Although the shapes of the cross-section 107α and cross-section 107β may be simply rectangular, reducing the area by which the elastic members 107 comes into contact with the dust-proofing glass 105 further improves dust-proofing capabilities. Accordingly, the cross-section 107α and cross-section 107β have shapes partly raised at the top.

The height of the cross-section 107α and cross-section 107β from the channel 104e is the same, and with the length in the X-axial direction (hereinafter, width) of the cross-section 107α as 107aI and the width of the cross-section 107β as 107bI, the relationship between width 107aI and width 107bI is 107aI>107bI. Accordingly, the relationship between the cross-sectional areas 107aS and 107bS of the two cross-sections 107α and 107β is 107aS>107bS. Now, to say the height of the cross-section 107α and cross-section 107β from the channel 104e means the height from the bottom face of the channel 104e to the tip portions 107a1 and 107b1 of the cross-section 107α and cross-section 107β (h in FIG. 4). The cross section of a side 107c (see FIG. 3(b)) orthogonal to the side 107a and side 107b is the same as height h for cross-sections 107α and 107β regarding the height from the channel 104e. The width of the cross-section of side 107c is formed larger than the width 107b1 of the cross-section 107β. That is to say, the cross-sectional area of the side 107c is made to be larger than the cross-sectional area 107β of the side 107b.

The channel for the elastic material formed from the cast for molding the elastic member 107 and the cover member 104 is in the direction indicated by arrows in FIG. 3(a). Accordingly, the molten elastic material flows in the order of the cross-section 107α portion→the cross-section 107β portion. That is to say, the elastic member poured in from the inlet 104d provided to the cover member 104 divides into a flow heading along the side 107a in the minus direction of the Y-axial direction, and a flow heading in the plus direction of the Y-axial direction. These two flows flow through the channel 104e of the side 107a which will later become the cross-section 107α of the elastic member 107, in the positive and negative Y-axial directions. The flow directions of the two flows are changed by 90 degrees, and both flow in along the side 107c in the minus direction of the X-axial direction. These two flows flow through the channel 104e of the side 107b which will later become the cross-section 107β of the elastic member 107, in the opposite direction as when flowing along the side 107a, and merge.

The elastic material has little fluidity, so if the cross-sectional area of the cross-section 107α is provided as around the same cross-sectional area of the cross-section 107β, the elastic material will solidify before the elastic member 107 is formed. As a result, there may be cases where the cover member 104 and dust-proofing glass 105 cannot be completely filled in, and dust-proofing capabilities cannot be obtained. On the other hand, the cross-sectional area 107aS of the cross-section 107α is configured larger than the cross-sectional area 107bS of the cross-section 107β (107aS>107bS). This improves the fluidity of the elastic material nearby the inlet 104d, thereby preventing the molten elastic material from solidifying before the elastic member 107 is formed.

FIG. 5(a) is a cross-sectional view of principal portions of the optical scanning apparatus 40 taken along the X-axial direction, and particle illustrates, of the four openings 104a provided to the cover member 104, the openings 104 at the longitudinal direction (X-axial direction) end of the optical scanning apparatus 40. An elastic member 108 is disposed between the housing 85 and the cover member 104. Filling in between the housing 85 and the cover member 104 in this way yields dust-proofing capabilities.

FIG. 5(b) is a perspective view of the cover member 104. FIG. 5(b) illustrates the face of the cover member on the inner side of the optical scanning apparatus 40. The elastic members 107 (cross-sections 107α and 107β) are provided on the outer side plane of the cover member 104, as illustrated in FIG. 5(a). An inlet 104d is connected to each of the recessed portions 104b surrounding the four openings 104a of the cover member 104. FIG. 5(b) illustrates the rear face side of the bottom of the inlets 104d, with the molten elastic material being poured in from the inlet at the rear face side in FIG. 5(b). The inlets 104d are provided between the ends of the openings 104a in the longitudinal direction of the openings 104a, and from here are connected to the recessed portions 104d. The material of the elastic members 107 is poured in the inlets 104d from outside of the cover member 104 (from the + side in the Z-axial direction to the − side in FIG. 5(b)). On the other hand, the material of the elastic members 108 is poured in inlets 108a from the housing 85 side of the cover member 104 (from the − side in the Z-axial direction to the + side in FIG. 5(b)). Note that the elastic members 107 and elastic members 108 are of the same material.

Due to this configuration, the elastic members 107 and elastic members 108 can be formed integrally with the cover member 104, and further the elastic members 107 and elastic members 108 can be formed from both sides of the cover member 104 in a single process. Accordingly, the number of procedures can be markedly reduced as compared to the convention method of applying the elastic material to the cover member 104 and fixing, and also, stability of dust-proofing capabilities can be realized. Thus according to the present embodiment, solidification of the molten elastic material before the elastic member is formed can be prevented, and dust-proof capabilities of the housing can be improved.

The present invention is not restricted to the above embodiment, and various modifications and alterations can be made without departing from the spirit and scope of the present invention. Accordingly, the following Claims are appended to make public the scope of the present invention.

This application claims the benefit of Japanese Patent Application No. 2013-185205 filed Sep. 6, 2013, which is hereby incorporated by reference herein in its entirety.

REFERENCE SIGNS LIST 85 housing
104 cover member
104a opening
104d inlet
105 dust-proofing glass
107 elastic member

The invention claimed is:

1. An optical scanning apparatus comprising;
a light source configured to emit a light beam;
a rotary polygonal mirror configured to deflect the light beam emitted from the light source, so as to scan the light beam on a photosensitive member in a scanning direction;
an optical member configured to guide the light beam deflected by the rotational polygonal mirror to the photosensitive member;
a housing in which the rotational polygonal mirror and the optical member are disposed;
a cover member attached to the housing, in which cover member there is formed an emission opening to externally emit the light beam deflected by the rotational polygonal mirror, from within a space formed by the housing and the cover member;
a transparent member configured to pass the light beam and to close off the emission opening;
a seal member formed of an elastic material, to close off a gap between the transparent member and the cover member;
an inlet for pouring in the molten elastic material when forming the seal member; and
a channel through which the molten elastic material poured in from the inlet flows, the channel being formed in the cover member following an edge of the emission opening so as to surround the emission opening,
wherein the inlet is connected to the channel between both ends of the emission opening in the longitudinal direction of the emission opening, and a cross-sectional area of the channel in the lateral direction of the emission opening following the edge of the emission opening closer to the inlet in the longitudinal direction of the emission opening, is larger than a cross-sectional area of the channel in the lateral direction following the edge of the emission opening farther from the inlet in the longitudinal direction of the emission opening.

2. The optical scanning apparatus according to claim 1, wherein the width of the channel in the lateral direction of the emission opening closer to the inlet is wider than the width of the channel in the lateral direction farther from the inlet.

3. The optical scanning apparatus according to claim 1, wherein a cross-section of the seal member in the lateral direction closer to the inlet, and a cross-section of the seal member in the lateral direction farther from the inlet, are shapes having a protruding portion protruding toward the outside of the cover member.

4. The optical scanning apparatus according to claim 3, wherein the height of the seal member from the bottom face of the channel closer to the inlet to the protruding portion, and the height of the seal member from the bottom face of the channel farther from the inlet to the protruding portion, are the same.

5. The optical scanning apparatus according to claim 3, wherein the length in the lateral direction from the protruding portion of the seal member closer to the inlet, to the protruding portion of the seal member farther from the inlet, is shorter than the length of the transparent member in the lateral direction.

6. The optical scanning apparatus according to claim 1, further comprising:
a pressuring member configured to pressure the transparent member against the cover member,
wherein the pressuring member has an opening to externally emit the light beam that has passed through the transparent member to the output of the cover member.

7. The optical scanning apparatus according to claim 6, further comprising:
a claw configured to attach the pressuring member to the cover member,
the pressuring member including a hole through which the claw is passed when the cover member is attached, and attaching portion to which the claw is attached after having passed through the hole.
wherein the claw is attached to the attaching portion by passing the claw through the hole, and sliding the pressing member in the longitudinal direction of the pressuring member.

8. The optical scanning apparatus according to claim 6, wherein the pressuring member has a pressuring portion on a face facing the cover member,
and wherein the pressuring portion comes into contact with and pressures the transparent member.

* * * * *